United States Patent
Rhême et al.

[11] Patent Number: 6,133,988
[45] Date of Patent: Oct. 17, 2000

[54] DEVICE FOR THE MEASUREMENT OF DISTANCES OR OF THE ANGLE OF INCIDENCE OF A LIGHT BEAM

[75] Inventors: Charles Rhême, Posieux; Peter Heimlicher, Freiburg, both of Switzerland

[73] Assignee: Optosys SA, Givisiez, Switzerland

[21] Appl. No.: 09/240,698

[22] Filed: Feb. 2, 1999

[30] Foreign Application Priority Data

Feb. 10, 1998 [EP] European Pat. Off. ............. 98810102
Dec. 17, 1998 [EP] European Pat. Off. ............. 98811242

[51] Int. Cl.[7] ............................ G01C 3/00; G01C 3/08; G01C 5/00
[52] U.S. Cl. .................. 356/3.01; 356/3.06; 356/139.07
[58] Field of Search .......................... 356/3.01, 3.03, 356/3.06, 375, 376, 138, 139.07; 359/669

[56] References Cited

U.S. PATENT DOCUMENTS 4,814,810  3/1989  Ishiguro ................................. 356/3.06
4,872,747  10/1989  Jalkio et al. ........................... 359/669
4,921,345  5/1990  Tsuchitani et al. ..................... 356/28

FOREIGN PATENT DOCUMENTS 0 458 752  11/1991  European Pat. Off. .

Primary Examiner—Frank G. Font
Assistant Examiner—Layla Lauchman
Attorney, Agent, or Firm—Foley & Lardner

[57] ABSTRACT

The device for the measurement of distances and of the angle of incidence of a light beam comprises an optical emitting system in order to project the light beam onto the object to be measured, and an optical receiving system in order to project the reflected light onto position detectors. The optical receiving system comprises two prisms which refract the reflected light beam with an angular compression and expansion, respectively, thus allowing to reduce the dimensions and the sensitivity of a detector for the measurement of a given measuring range.

13 Claims, 6 Drawing Sheets

DEVICE FOR THE MEASUREMENT OF DISTANCES OR OF THE ANGLE OF INCIDENCE OF A LIGHT BEAM

BACKGROUND OF THE INVENTION

The present invention refers to a device for the measurement of distances or of the angle of incidence of a light beam, comprising an optical emitting system in order to project said light beam onto the object to be measured, and an optical receiving system in order to project the reflected light onto a position detector.

Measurements of the angle of incidence or of the distance by means of opto-electronic systems are generally based upon the triangulation principle as described in FIG. 1. In order to obtain a good precision, this method requires a large basis, which constitutes a first drawback, the second drawback being the strongly limited measuring range which results in a large dead zone Z. These drawbacks are particularly inconvenient in the case of a detector, which must contain the light source and the receptor in a single housing whose dimensions should be as small as possible.

SUMMARY OF THE INVENTION

On the background of this prior art, it is the object of the present invention to provide a device for the measurement of distances or of an angle of incidence of a light beam which has a small basis, i.e. whose dimensions are reduced with respect to known devices, and which allows an extended measuring range.

This object is attained by a measuring device wherein said optical receiving system comprises a prism which refracts the light beam with a compression of the angular variation thereof, thus allowing to reduce the extent of the position detector required in order to measure a corresponding measuring range, resp. by a measuring device wherein said optical receiving system comprises a prism which refracts the light beam with an expansion of its angular variation, thus allowing to increase the sensitivity of the position detector for small angular variations.

BRIEF DESCRIPTION OF THE DRAWINGS

The invention will be explained in more detail hereinafter with reference to the appended drawings which illustrate embodiments of the invention by way of examples.

DETAILED DESCRIPTION OF THE INVENTION

Figure 1:
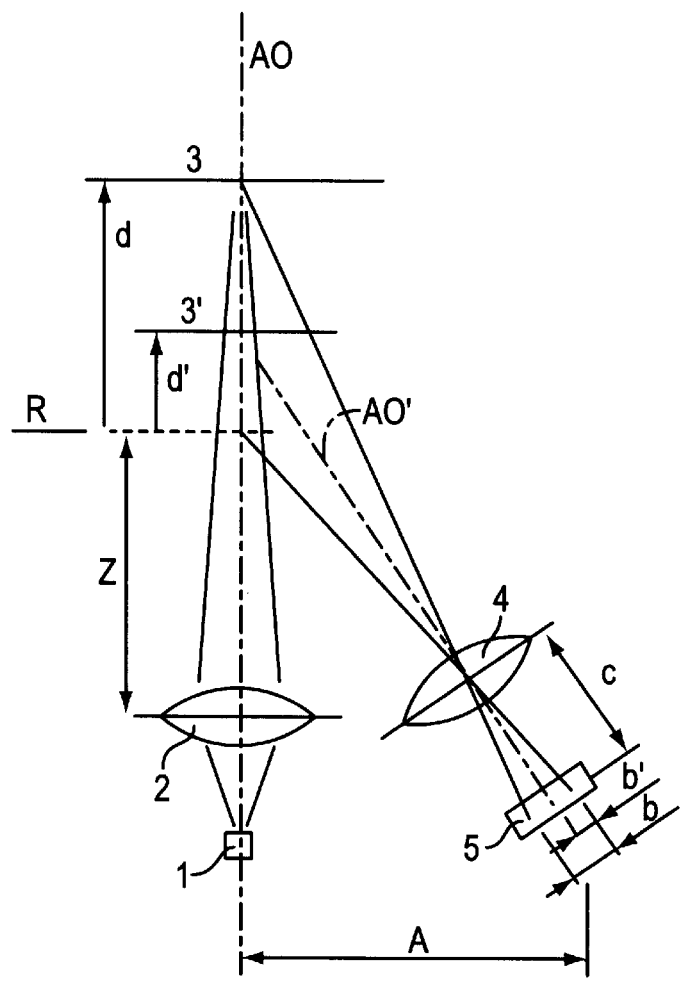
FIG. 1 schematically shows the measuring principle of triangulation.

FIG. 1, which schematically represents the known principle of a distance measurement by triangulation, shows light source 1 and the optical emitting system which projects the beam emitted by the light source onto the measured objects 3 and 3', located at a distance d resp. d' from a reference surface. The light which is diffusely reflected by the measured object is collected in a receiving lens or an optical receiving system 4 and projected onto a position detector 5 which is located at a distance C from said lens or receiving system 4. In this schematic arrangement, the distance b from the reference R on the position detector is a function of the measured distance d.

In order to obtain a high precision, a large basis A between optical axis AO of the optical emitting system and optical axis AO' of the optical receiving system is necessary. Furthermore, as appears clearly in FIG. 1, the measuring range is limited by the optical arrangement and by the size of the position detector. Also, the important dead zone Z will be noted.

The fundamental idea of the present invention consists in compressing or amplifying the angular variation of the light in the optical receiving system in a non-linear manner. The realization of the inventive idea allows to provide a compact detector having a large measuring range and whose optical receiving and emitting systems are closer to each other.

Figure 2:
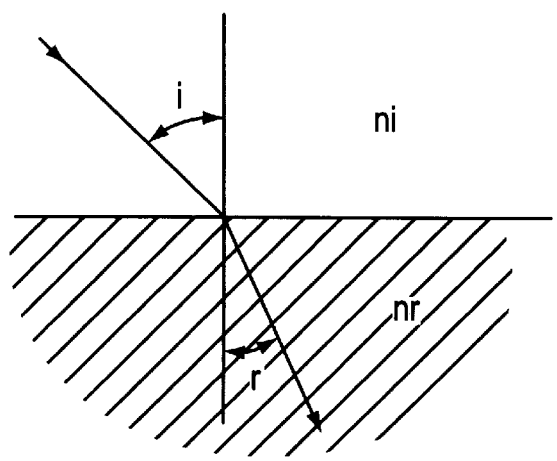
FIG. 2 describes the law of Snell-Descartes.

The propagation of light depends on the index of refraction of the traversed medium and may be expressed by the law of Snell-Descartes (see FIG. 2):

$$\frac{\sin i}{\sin r} = \frac{n_r}{n_i},$$

where i is the angle of incidence and r is the angle of refraction, $n_i$ being the index of refraction of the air and $n_r$ the index of refraction of the traversed medium. In the case of a beam which propagates in the air and penetrates into glass (n=1.5), it appears that the ratio $\Delta r/\Delta i$ varies from 0.66 to 0 as i varies from 0 to 90°. $\Delta r$ represents the variation of the angle of refraction and $\Delta i$ the variation of the angle of incidence.

Hence, when considering the propagation of a light beam which passes from a more refringent medium to a less refringent medium, an expansion of the angular variations according to the law of Snell-Descartes up to total reflection is observed.

In order not to destroy the compression or amplification effect, care must be taken that the entrance and exit surfaces are not parallel. Usually, this is realized by using a prism, but it is also possible to make use of an optical material whose index of refraction varies along the path of the light beam. A compression or an amplification of the angular variations will thus be obtained even in the case of a plate whose entrance and exit surfaces are parallel.

Figure 3:
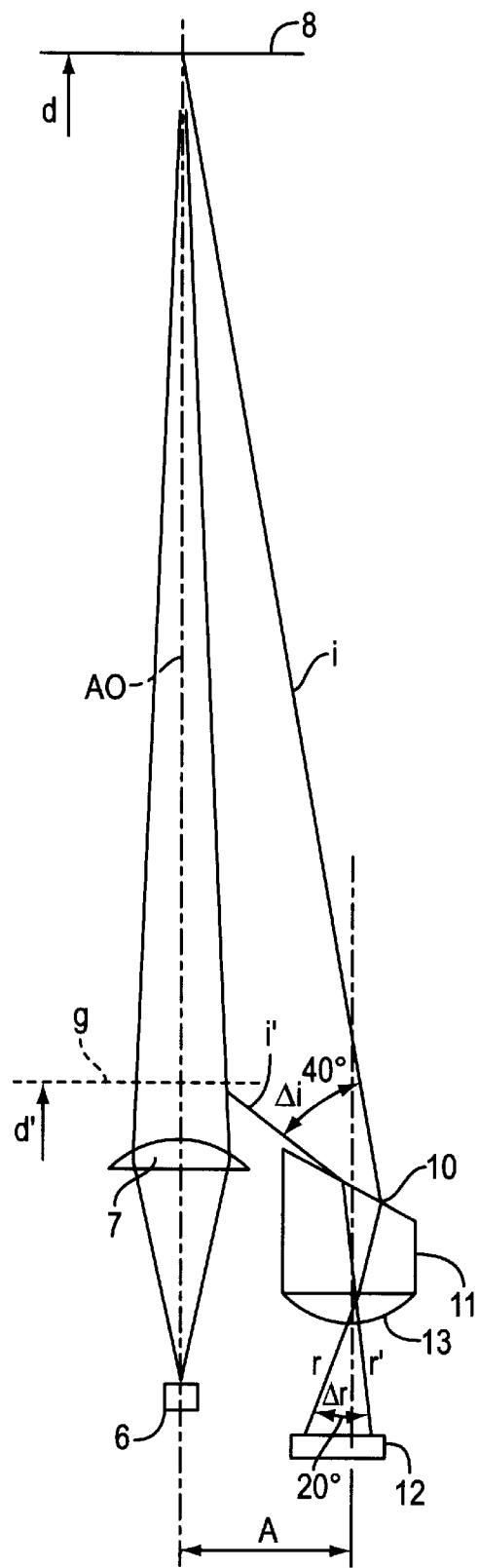
FIG. 3 shows the measuring principle of the invention.

Reference will now be made to the case of a detector (see FIG. 3), the latter being a part of a measuring device which further comprises electric and electronic circuits and other components. If it is intended to perform measurements by means of a light beam whose angle of incidence, i.e. the angle of the reflected light, varies by $\Delta i=40°$, it is possible according to the invention to compress this variation to approximately 20° by means of a suitable prism. The measuring range of the detector will thus be considerably enlarged. The determination of the angles formed by the faces of prism 11 allows an optimal angular compression on the entrance surface of said prism and prevents an excessive reduction of the compression on the exit surface. The emerging light beam is subsequently focused on the position detector by a lens which may also be integral with the exit surface of the prism. In a very schematic manner, FIG. 3 shows light source 6, the optical emitting system 7 with optical axis AO, and the measured object 8 at a certain distance d from the source, as well as object 9, shown in broken lines at a reduced distance d' which represents a reduced dead zone FIG. 3 shows a variation between incident light beam i coming from object 8 situated at a greater distance d and incident light beam i' coming from object 9 situated at a shorter distance d', i.e. a Δi of 40° impinging on entrance surface 10 of prism 11 results in a variation Δr of 20° of the light beam at the exit of the prism. In other words, despite a smaller distance between the light source and the position detector, the measuring range of detector 12 is larger and its dead zone is reduced. FIG. 3 also shows that lens 13, which focuses the light beam emerging from the prism on the position detector, may be integral with the prism.

Figure 4:
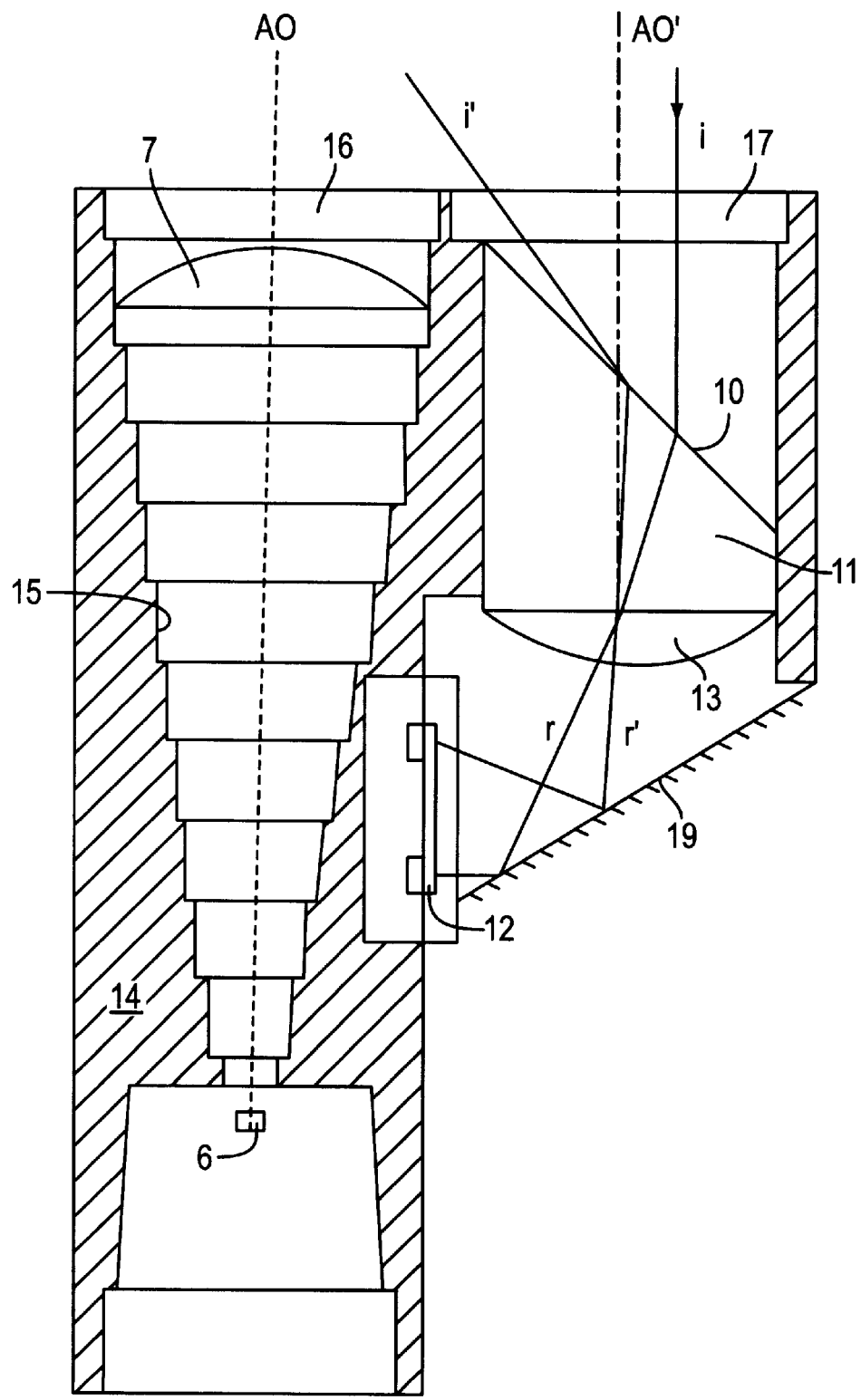
FIG. 4 shows a first embodiment of a device of the invention.
Figure 5:
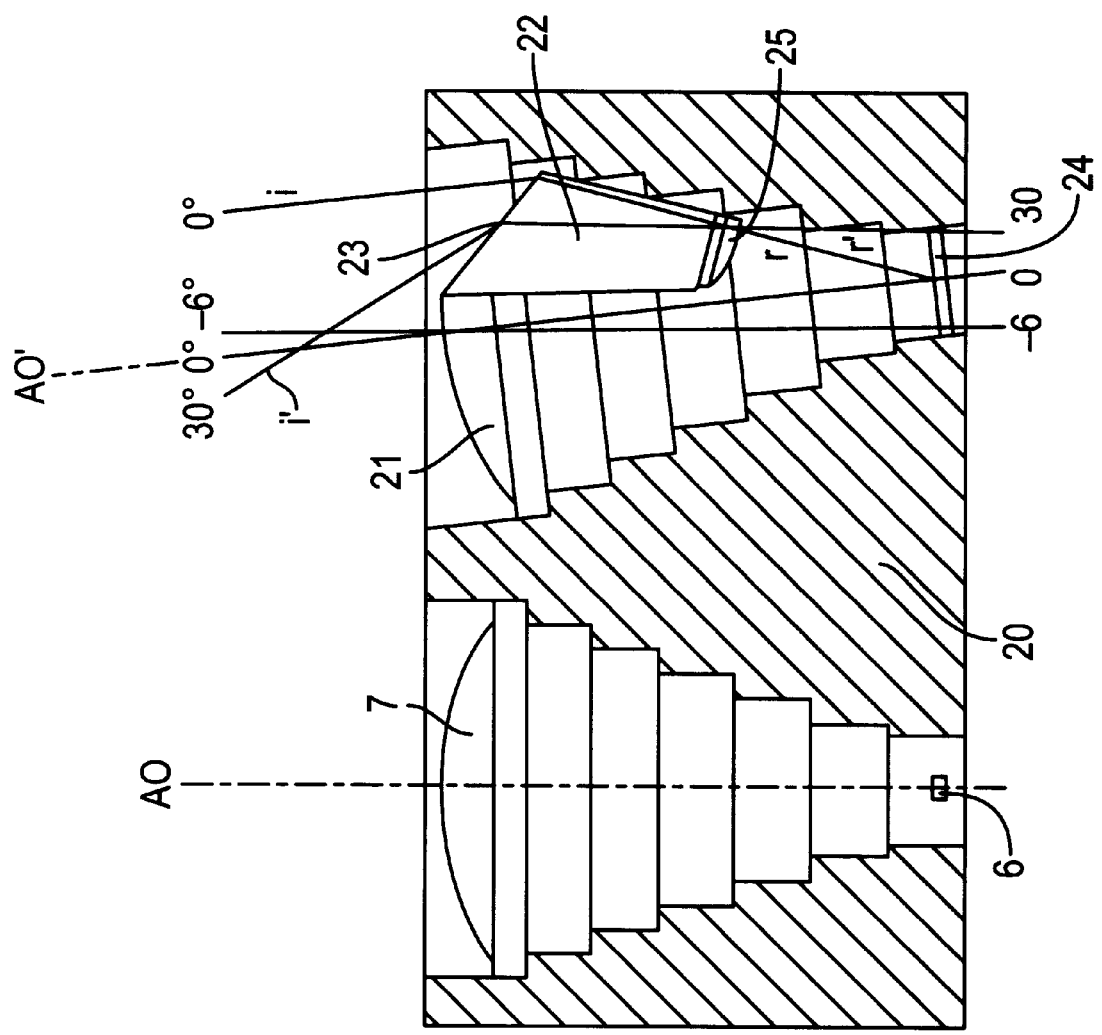
FIG. 5 shows a second embodiment of the invention.

FIGS. 4 and 5 show two exemplary embodiments of a detector, i.e. of an opto-electronic assembly comprising a light source and a position detector. FIG. 4 is a schematic drawing showing an emitting system on the left and a receiving system on the right, light source 6 in housing 14 comprising known (non-represented) means for holding and adjusting the light source and blackened internal steps 15 in order to keep reflections as low as possible. Near the exit of the housing, optical system 7 is visible which projects the light from light source 6 onto the measured object (not shown). Optical axis AO is illustrated as a broken line. The housing is externally closed by an optical window 16.

The receiving system is integrated in the same housing and externally closed by an optical window 17. Incident light beam i' coming from the nearer one of the measured objects is at approximately 40° with respect to optical axis AO and falls on entrance surface 10 of prism 11. Said entrance surface 10 is cut at approximately 45° with respect to optical axis AO'. Refracted beam r' of incident beam i' subsequently passes through lens 13 which is integral with the exit surface of the prism and whose focal distance is e.g. equal to f=6. Then, the emerging refracted beam falls on a mirror 19 which reflects the beam onto position detector 12. Incident light beam i coming from the position of the farther one of the measured objects is refracted by entrance surface 10 of the prism and becomes refracted beam r which also passes through lens 13 and falls on mirror 19 from where it is reflected onto position detector 12.

The measuring device is accommodated in a housing and comprises the position detector as well as the measuring and control circuits known to those skilled in the art. The construction according to FIG. 4 allows to realize a detector whose dimensions are reduced with respect to detectors of the prior art.

The embodiment according to FIG. 5 allows to further increase the detection distance and to obtain a large measuring range with a compact construction and reduced dimensions. The emitting system and the receiving system are disposed side by side in a single housing 20. The emitting system comprises a light source 6 and a focusing lens 7 which projects the light onto the non-represented object to be measured. The receiving system is constituted by the combination of a prism with a focusing lens, as described in the previous example, and of a lens or lens portion which focuses the reflected light on a similar position detector.

As the reflected light impinges at an angle comprised between −6° and 0° with respect to the optical axis, lens 21 focuses these beams between points −6 to 0 on position detector 24.

If the angle of incidence varies between 0° and 30°, incident beams i and i' are refracted by entrance surface 23 of prism 22 and subsequently focused by lens 25 on position detector 24 which is disposed at a right angle with respect to the optical axis. Refracted beams r and r' are focused on the detector between point 0, which lies exactly in the optical axis of the system, and point 30 at the end of the detector.

The non-linear angular compression produced by the prism reduces the angular sensitivity of the measurement as the measured distance decreases. The quantity of light collected by the prism also decreases as the measuring distance decreases since a greater proportion is then reflected outwards by the entrance surface of the prism. This is also a favorable parameter which tends to prevent a saturation of the measuring device.

Figure 6:
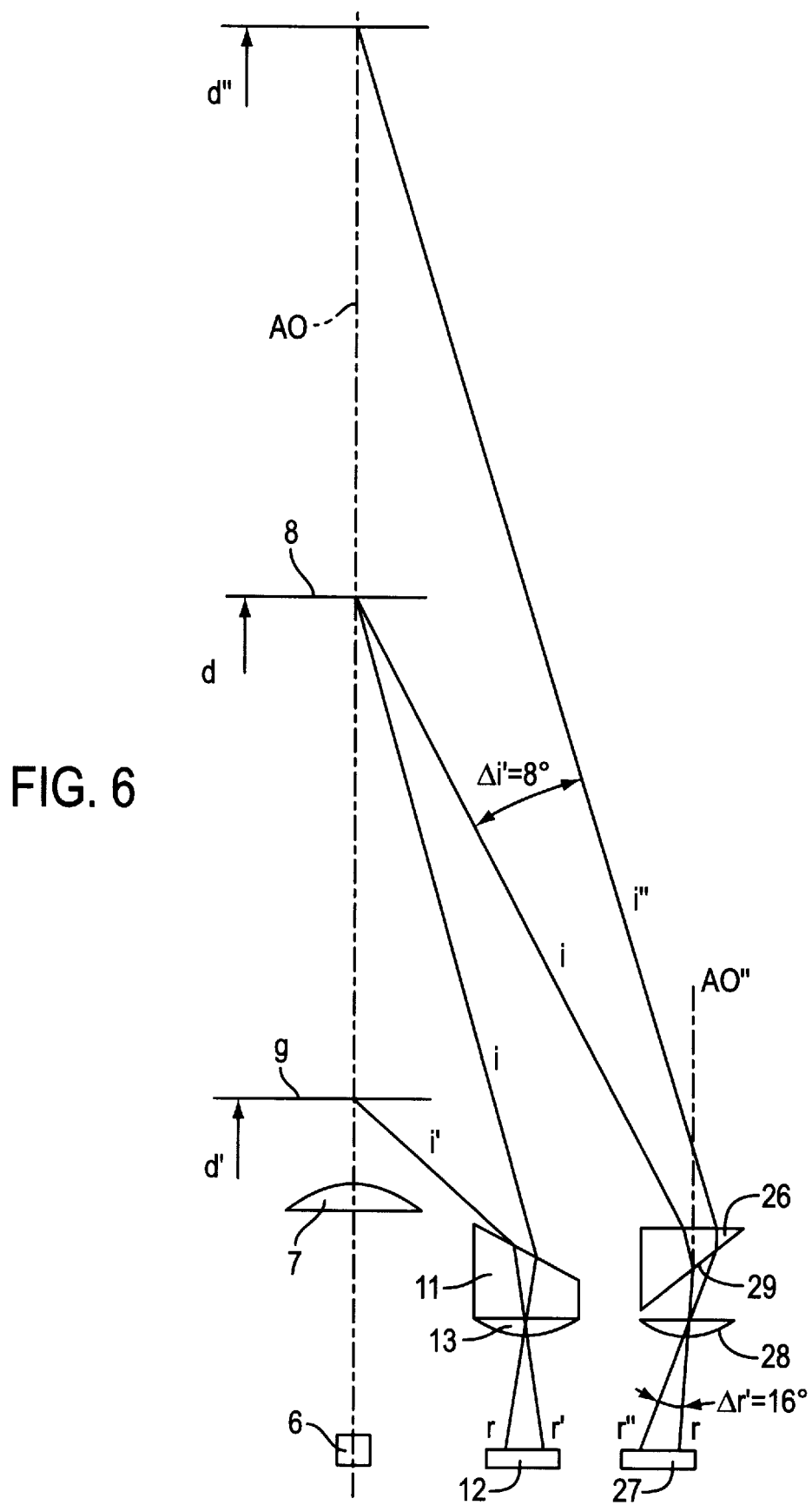
FIG. 6 shows a measuring principle which is extended with respect to that of FIG. 3.

With the optical arrangement described in FIG. 6, it is intended to further increase the detection distance by using prism 26 in order to effect an angular expansion rather than a compression, so as to increase the measuring sensitivity on position detector 27. For measurements in the short range, the information of position detector 12 will be used which allows a compressed measurement of the angular variation of the incident beam from i' to '. Measurements in the long range will be effected by position detector 27 which responds to an expanded value of the angular variation Δi'=i to i" through prism 26 and lens 28.

The schematic illustration of FIG. 6 shows the arrangement of FIG. 3 and in addition the arrangement for the expansion of the beam. Prism 26 is arranged in such a manner that the surface which is inclined with respect to optical axis AO", which in turn is parallel to the optical axis AO of the optical receiving system, is exit surface 29. Exit surface 29 may form an angle of approximately 40° with optical axis AO". FIG. 6 shows a variation between the incident beam i coming from object 8 situated at an intermediate distance d and incident beam i" coming from the object situated at a greater distance d" of Δi=8 on prism 26 which produces a variation Δr' of 16° of the beam on detector 27 at the exit of the prism.

Depending on the requirements, the arrangement of FIG. 6 allows for realization detectors for long distance measurements which offer a large measuring range due to the combination of an optical system with angular expansion or a conventional optical system for long distances, and of an optical system with angular compression of the short range.

Figure 7:
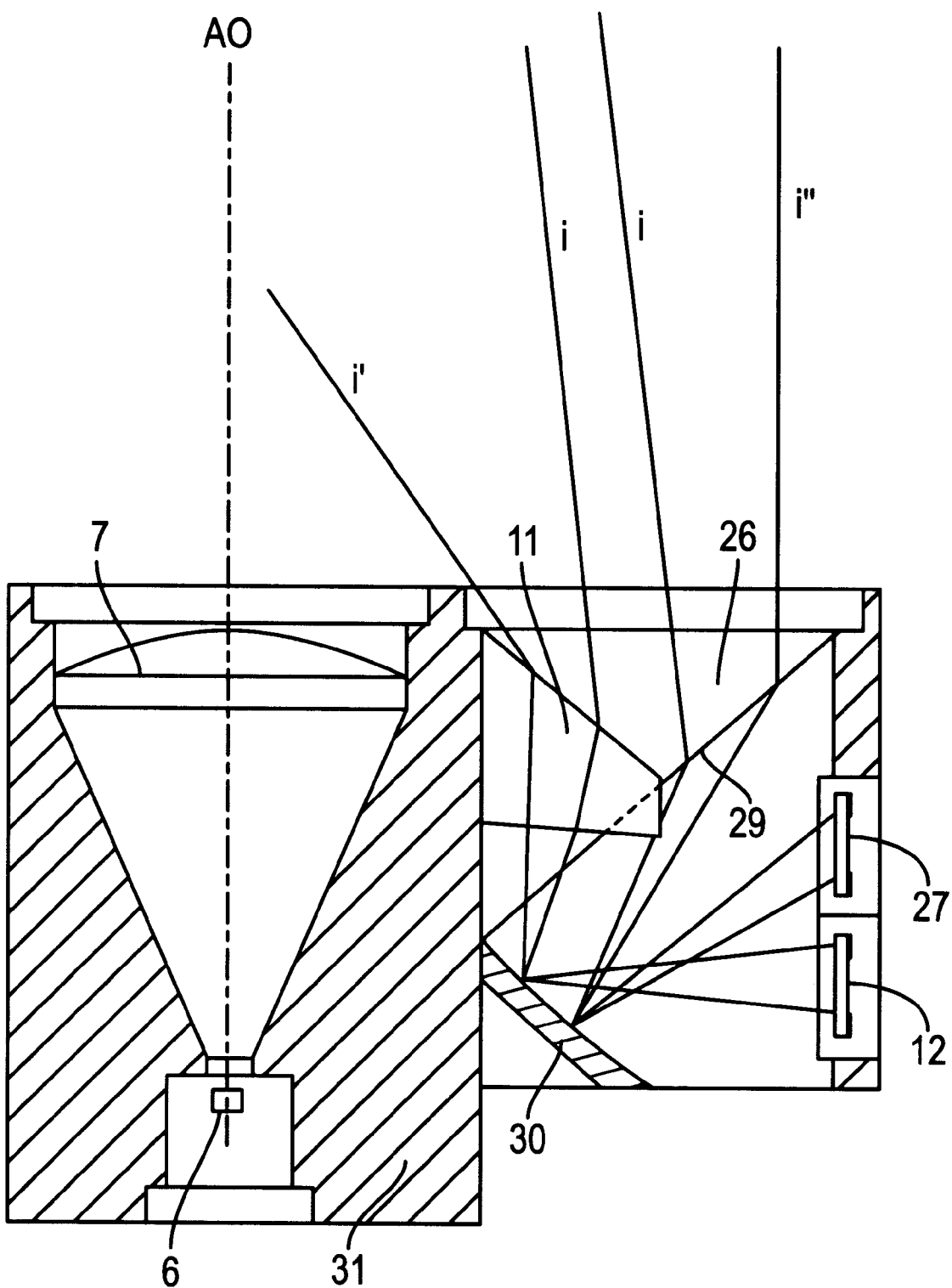
FIG. 7 shows another embodiment of a device of the invention.

The embodiment described in FIG. 7 shows the realization of a detector which unites the advantages of the angular compression by prism 11 for short-range measurements and those of the angular expansion by prism 26 for long-range measurements. The emitting system and the receiving systems including the two prisms are integrated side by side in a single housing 31, the construction being very compact due to the use of a single spherical mirror 30 which replaces lens 13 or 25 and lens 28 for the purpose of focusing the incident beams on position detectors 12 or 24 for short-range measurements and 27 for long-range measurements. It is possible to replace the single spherical mirror by two spherical mirrors, i.e. one for each prism. It is possible to provide a single detector instead of the two detectors 12 or 24 and 27.

While the two procedures of compression and expansion of the angular values have been described and demonstrated simultaneously in FIGS. 6 and 7, it is quite possible to apply only one of the two procedures.

We claim:

1. A device for the measurement of distances or of the angle of incidence of a light beam, comprising:

an optical emitting system to project said light beam onto an object to be measured; and an optical receiving system to project reflected light onto a position detector, wherein said optical receiving system comprises a prism which refracts said light beam with a compression of its angular variation, thus allowing to reduce the size of the position detector required to measure a distance.

2. A device for the measurement of the angle of incidence of a light beam, comprising an optical emitting system to project said light beam onto the object to be measured, and an optical receiving system to project reflected light onto a position detector, wherein said optical receiving system comprises a prism which refracts the light beam with an expansion of its angular variation, thus allowing to increase sensitivity of the position detector for small angular variations.

3. The device of claim 1, wherein an entrance surface of said prism forms an angle of approximately 45° with an optical axis of the optical receiving system.

4. The device of claim 2, wherein an entrance surface of said prism forms an angle of approximately 45° with an optical axis of the optical receiving system.

5. The device of claim 1, wherein an exit surface of said prism comprises optical elements to project the refracted beam onto the position detector.

6. The device of claim 5, wherein optical elements at the exit surface of a first prism and at the exit surface of a second prism are constituted by a single spherical mirror or by two spherical mirrors which focus the refracted beam on said position detector(s).

7. The device of claim 5, wherein said optical receiving system, comprising said prism, is separated from the optical emitting system and comprises a mirror which is arranged under the exit surface of said prism and said optical elements in order to project the refracted beam onto the position detector which is arranged in parallel to the optical axis, the optical emitting and the optical receiving systems forming a detector which is arranged in a housing.

8. The device of claim 1, wherein said optical receiving system comprises a combination of said prism with a focusing lens and of a focusing lens or lens portion, each of said elements being designed in such a manner as to receive the reflected light and to project said reflected light onto said position detector at the angle formed between the beam and the optical axis of the optical receiving system.

9. The device of claim 8, wherein said position detector is disposed at 90° with respect to the optical axis of the optical receiving system.

10. The device of claim 1, comprising an assembly which combines the optical emitting system, the optical receiving system which refracts the light beam with a compression, the optical receiving system which refracts the light beam with an expansion of the angular variation, as well as the position detector(s) in one housing.

11. A method for the measurement of distances or of the angle of incidence of a light beam, comprising:

projecting said light beam onto an object to be measured; and projecting reflected light from said object onto a position detector with a prism which refracts said light beam with a compression of its angular variation, thus facilitating the reduction in size of the position detector used to measure a distance.

12. The method of claim 11, further comprising:

arranging said prism such that an entrance surface of said prism forms an angle of about 45° with an optical axis of an optical receiving system housing said prism.

13. The method of claim 11, further comprising:

directing the refracted beam onto said position detector with a spherical mirror.

* * * * *